United States Patent [19]

Jerome

[11] Patent Number: 5,743,217
[45] Date of Patent: Apr. 28, 1998

[54] TURKEY LOADING APPARATUS AND METHOD

[76] Inventor: Wallace H. Jerome, 1480 E. Maple Ave., Barron, Wis. 54812

[21] Appl. No.: 370,444

[22] Filed: Jan. 9, 1995

[51] Int. Cl.$^6$ ............................................. A01K 29/00
[52] U.S. Cl. ............................................. 119/846
[58] Field of Search ............................ 119/843, 845, 119/846; 198/314, 461.3

[56] References Cited

U.S. PATENT DOCUMENTS

| | | | |
|---|---|---|---|
| 3,420,211 | 1/1969 | Hartrickson | 119/846 |
| 3,958,536 | 5/1976 | Crowder | 119/82 |
| 4,600,351 | 7/1986 | Nelson | 119/846 |
| 5,325,820 | 7/1994 | Briggs et al. | 119/846 |

*Primary Examiner*—Thomas Price
*Attorney, Agent, or Firm*—Merchant, Gould, Smith, Edell, Welter & Schmidt, P.A.

[57] ABSTRACT

An improved method and apparatus for automatically, efficiently and safely loading birds, and preferably turkeys, through side access ports of stacked transport coops are disclosed. A primary lift conveyor is positioned to lift the birds to be loaded at a relatively slow speed from a ground position to an exit end thereof elevated to a height of the coop access gate on a transport vehicle. A second loading conveyor apparatus is aligned with the exit end of the lift conveyor for receiving birds from the lift conveyor and accelerating them to a second speed at which they are automatically deposited into the coop. An adjustable deflector ceiling member is provided for causing the birds to assume and to maintain a sitting position and desired orientation during the acceleration and loading process such that the birds scoot into the coop without the requirement for manual assistance. The loading conveyor apparatus may form an integral extension of the lift conveyor structure or may be removably detachable therefrom.

33 Claims, 5 Drawing Sheets

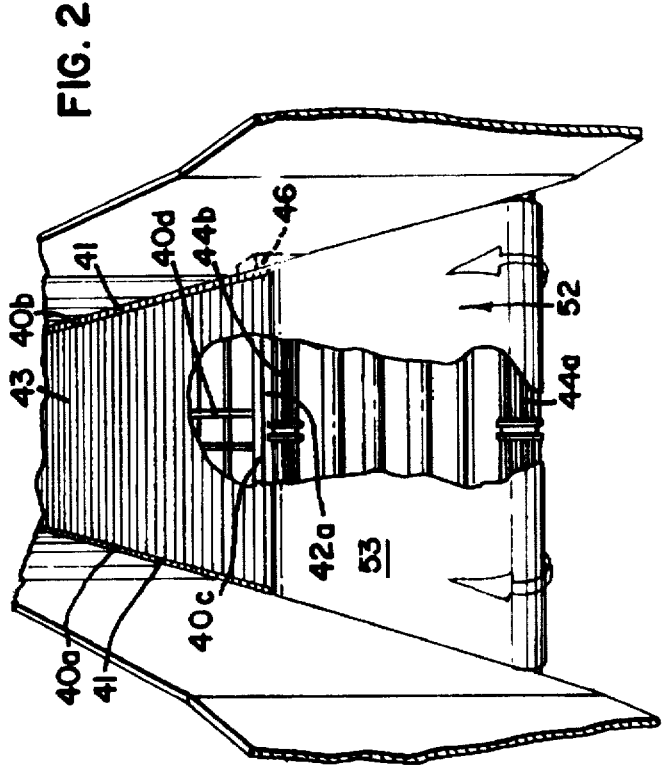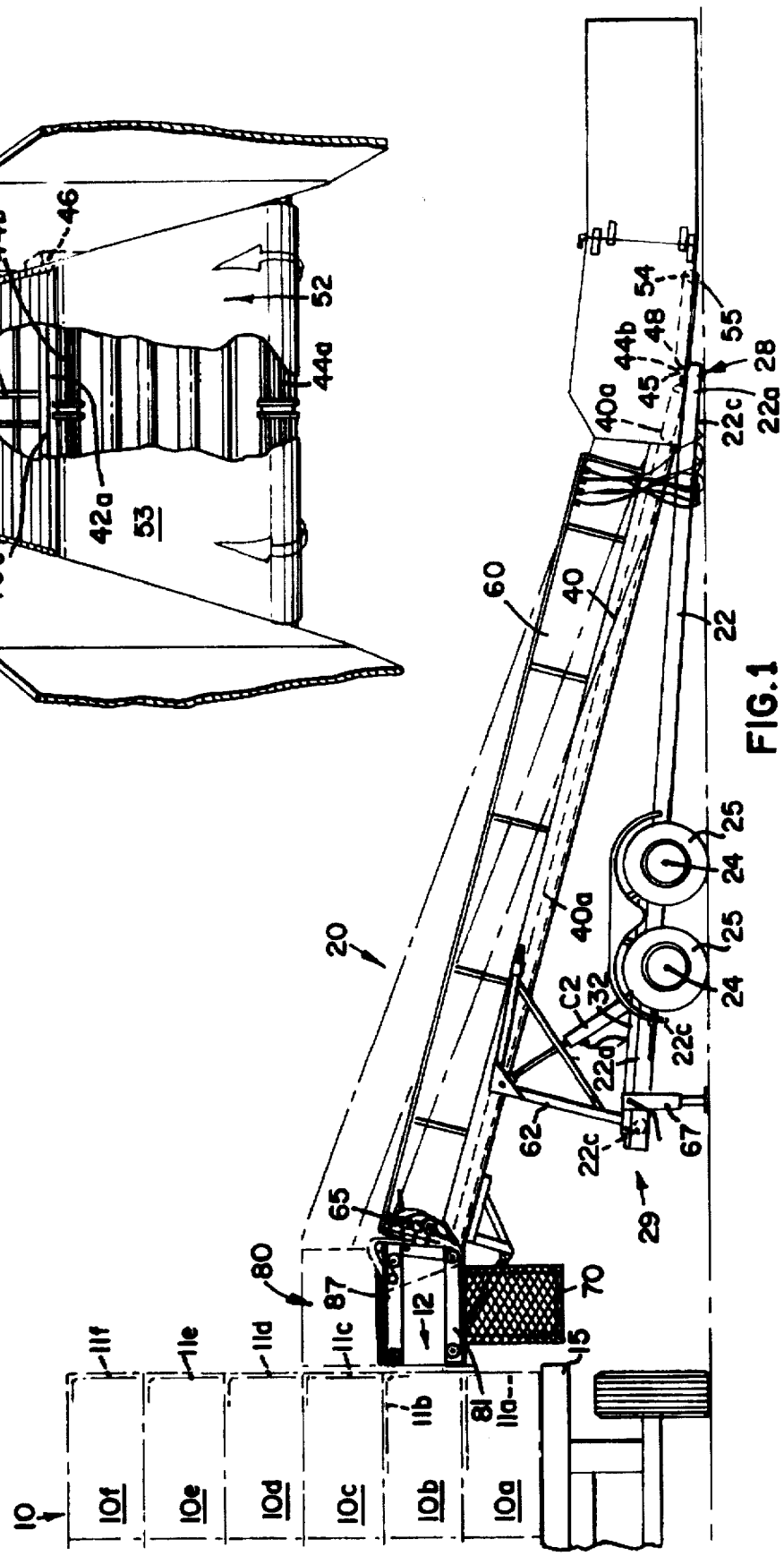

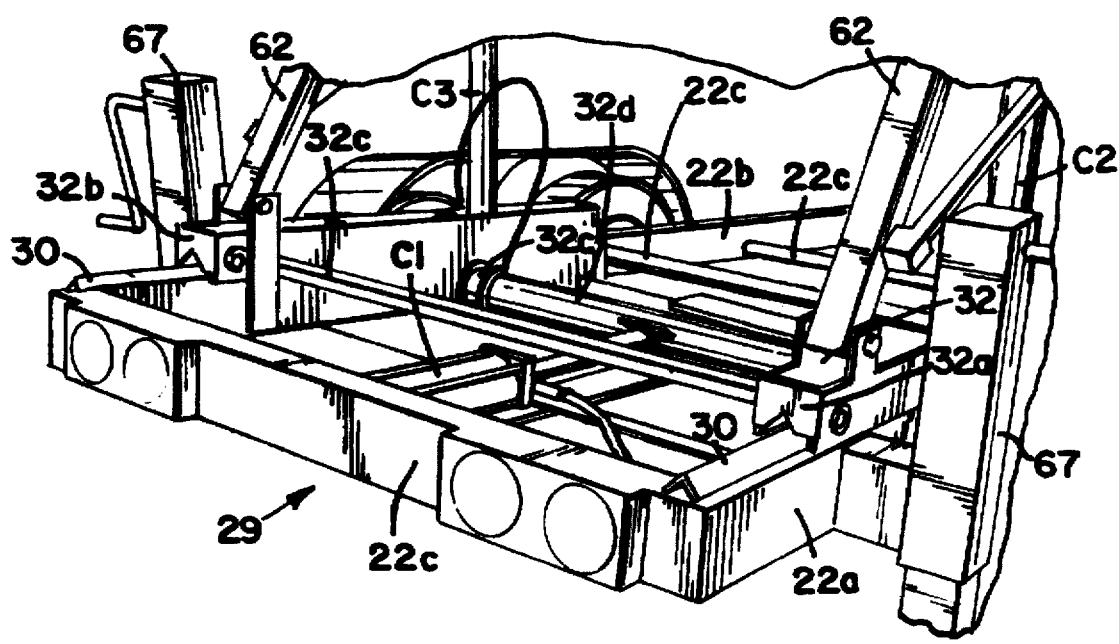

TURKEY LOADING APPARATUS AND METHOD

FIELD OF THE INVENTION

This invention relates generally to loading apparatus, and more particularly to an improved apparatus and method for loading turkeys into transport cages.

BACKGROUND OF THE INVENTION

Turkeys and chickens (hereinafter commonly referred to as "birds") are generally transported in large transport cages or coops stacked upon one another in rows and columns on large transport trucks such as flatbed trucks or the like. An example of such a transport configuration of cages is described and illustrated in my pending U.S. patent application Ser. No. 08/033,767 filed on Mar. 18, 1993 entitled Apparatus and Method for Unloading Contents of Multilayer Containers. The description and disclosure of my prior application are herein incorporated by reference to the extent that a more detailed description of the art is desired. Typically, such cages are of dual or multiple compartment construction and are stacked for loading on both sides of a truck trailer, with their coop doors or gates facing the outside sides of the trailer. Such multilevel cages or coops are typically stacked from 8 to 10 feet high and are built in sections of 8 feet to 16 feet long and approximately 45 inches in depth. The doors of the coops that are designed to hold turkeys generally lift up and slide back into the coop near their top, in overhead door manner. A transport truck typically carries as many as 160 chicken coops stacked 12 high, holding approximately 13,200 chickens. A transport truck for turkeys typically holds as many as 120 turkey coops holding approximately 1,440 turkeys, with the coops stacked 6 levels high.

Various types of multiple conveyor loading structures have been used in the past for loading poultry from poultry houses into transport cages. An example of such structures is described in U.S. Pat. No. 3,958,536. Such loading structures have primarily been concerned with the ability to flexibly move the exit end of the loading conveyor relative to the transport cages or coops, and have generally been used to load poultry coops through the tops of the coops by dropping the birds through an access port in the top of the coop. While such techniques are suitable for loading chickens, they are not practical for loading turkeys, which are much larger than the chickens, and are not applicable to the loading of stacked transport coops of the type described above which are loaded from access ports through their sides.

Loading of such cages or coops, and particularly for the loading of turkeys into such coops, has been a labor intensive process. The typical prior art methods of loading turkeys into such coops have used a moving conveyor belt to lift the turkeys to be loaded from ground level to the access gate of the coop into which they are being loaded. The height of the upper exit end of the conveyor is adjustable, typically by means of hydraulic cylinders, to generally align with the access door of the coop being loaded. Such loading conveyor structures are well-known in the art and are sold by various manufacturers such as Peltz Mfg. Inc., Bright Coop Company and Bridgeview Mfg., Inc. While such loading conveyors have greatly simplified the loading process, they have a number of shortcomings that are addressed by this invention.

In particular, the known coop loading conveyor structures and techniques are labor intensive and generally require the birds to be physically grabbed by both legs and a wing at the upper end of the conveyor and shoved or pushed by an operator into the coop being loaded. This is not a particularly pleasant or easy task since turkeys are heavy and are not particularly cooperative when they reach the top of the conveyor. Turkeys have a tendency to get nervous and agitated as they traverse the length of the lift conveyor and are generally uncooperative by the time they reach the top of the conveyor. Since the weight of a turkey varies anywhere from approximately 25 pounds to 40 pounds, the manual process of individually handling and often lifting over a thousand turkeys to complete a loading operation can be very exhausting. In addition, such rough handling during the loading operation can cause bruising and damage to the bird. The bird is also subject to being damaged if its feet get caught between the conveyor and the cage.

Since the vertical opening height of the cage or coop opening through which the birds are loaded is typically only 16 inches in height, it is desirable for the turkeys to be disposed in a sitting position just prior to their entry into the coop. To accomplish this with prior loading systems, a ceiling-like deflector panel is placed over the main lift conveyor near its top end. When a turkey's head engages the deflector member, the turkey will duck its head and neck and generally drop to a sitting position just prior to placement by the loading assistant into the coop. A problem with such prior art systems is that such deflector often can have the effect of causing the turkey's head to catch on the deflector, thereby tipping the turkey over backwards near the top of the conveyor ramp. This can result in either damaging the turkey's neck or head, or in placing the turkey in an undesirable loading position.

Therefore, there is a need for a loading apparatus and technique, particularly suitable for turkeys, that automatically lifts and loads the birds into transport cages/coops in a fast and efficient manner, and in a manner that requires a minimum of human assistance and intervention. There is also a need for such a loading system which is relatively safe and non-traumatic to the bird being loaded. The present invention provides such a system and addresses many of the shortcomings of the prior art loading systems.

SUMMARY OF THE INVENTION

This invention provides both an improved method and apparatus for efficiently and automatically loading birds, and particularly turkeys, into stacked transport coops through the side access ports of the coops. The loading operation is efficiently performed by means of this invention, with minimal human operator assistance being required.

According to one aspect of the invention there is provided a method of loading birds into a transport coop of the type having an access loading port opening through a side of the coop, comprising the steps of:

a. positioning an exit end of a bird loading conveyor apparatus into loading proximity with the access port of the transport coop;

b. moving birds by means of the loading conveyor apparatus from an entrance end to the exit end thereof; and c. accelerating the birds being moved at the exit end to automatically deposit the birds into the coop through its access port.

The invention preferably also includes the step of causing the birds being loaded to assume a sitting position prior to acceleration thereof, such that the birds are in a sitting or crouched position as they scoot from the loading conveyor into the coop without requiring manual intervention by the operator. A further aspect of the invention includes the step of vertically sandwiching the birds during the acceleration step between a pair of oppositely disposed conveyor belts moving generally at the same speed and in the same direction, such that the birds maintain their vertical attitude position throughout the acceleration process.

According to yet another aspect of the invention, there is provided a method of loading birds from a conveyor apparatus into a column of stacked transport coops of the type having access port openings generally vertically aligned through a sidewall of the coops, comprising the steps of:

a. moving the birds to be loaded by a first conveyor moving at a first speed, from an entrance position remote from the coops to an exit position adjacent to at least one of the coops to be loaded;

b. accelerating the birds by second conveyor operatively aligned with the exit end of the first conveyor to a second speed which is greater than the first speed; and c. directing and depositing the accelerated birds from the second conveyor through the access port of the coop being loaded, thereby loading the birds into the coop.

According to yet a further aspect of this method, there may be included the step of providing a moving ceiling overlying the second conveyor for maintaining the birds in a desired vertical orientation while on the second conveyor. There may also be provided a step of causing the birds to crouch to a sitting position near the exit end of the first conveyor such that they enter the coop in a compact manner for minimizing injury to the birds. This method of practicing the invention further includes the step of first filling one coop with birds to a desired coop capacity, and then adjusting the vertical heights of the exit end of the first conveyor and the second conveyor, to operatively align with the access port of a second of the stacked transport coops, for loading the second transport coop. The invention further contemplates that acceleration of birds by the second conveyor includes accelerating the lineal speed of the birds to a speed at least 25% greater than the speed at which they were traveling on the first conveyor, and up to speeds from 3 to 5 times faster than the speed at which they were traveling on the first conveyor.

According to yet a further aspect of the invention, there is provided a loading apparatus for loading birds into a transport coop through an access port formed in the side of the coop, comprising:

a. a lift conveyor of a type suitable for carrying birds to be loaded into the coop, having a first conveyor belt extending between first and exit ends, wherein the first end is disposed adjacent the ground;

b. means for moving the lift conveyor belt at a first speed;

c. lift means operatively connected with the lift conveyor for controllably elevating the exit end of the lift conveyor belt for alignment with the access port of the transport coop;

d. a loading conveyor generally longitudinally aligned with and forming an operative extension of the lift conveyor at its exit end, wherein the loading conveyor has a loading conveyor belt suitable for carrying the birds and extending between the lift conveyor belt exit end and a distal loading end configured for operative alignment with the access port of the coop; and e. means for operatively moving the loading conveyor belt at a second speed which is relatively faster than the first speed such that the birds conveyed by the lift conveyor are deposited from its exit end onto the second conveyor and are accelerated and deposited by the second conveyor into the transport coop through its access port.

According to yet a further aspect of the invention, the loading conveyor can include an upper conveyor belt vertically spaced from and overlying the loading conveyor belt and traveling at the same speed as the loading conveyor belt, so as to operatively receive and sandwich the birds therebetween such that birds engaging both the loading and the upper conveyor belts are subjected to generally the same forces in the direction of travel of such belts. The invention generally contemplates that the second speed of the loading conveyor belt is at least 25% faster than that of the lift conveyor belt and could be twice the speed of the lift conveyor belt and up to 3 or 5 times faster than that of the lift conveyor belt. According to yet a further aspect of the invention, the loading apparatus preferably includes hydraulically actuated means for varying the vertical and horizontal positions of the lift and loading conveyor belts. The invention also contemplates means for coordinating the relative movements of the lift and loading conveyor belts such that if the loading conveyor belt stops, the lift conveyor belt would also automatically stop. The invention further contemplates means for controllably adjusting the position of the loading end of the loading conveyor belt relative to the exit end of the lift conveyor belt, and an operator platform attached to and movable with the loading conveyor belt for enabling an operator to accurately view and control the automated loading operation.

According to yet a further aspect of the invention, there is provided a loading conveyor attachment for operative connection to a turkey loading lift conveyor of the type configured to move turkeys from an entrance end to an exit end of the lift conveyor, wherein the attachment comprises:

a. a support frame;

b. a first loading conveyor belt mounted to the support frame and operatively extending between an entrance end and a loading end thereof;

c. means operatively connected with the loading conveyor belt for moving the loading conveyor belt at a speed greater than that of the lift assembly conveyor; and d. means for detachably mounting the support frame to an exit end of the lift apparatus such that the entrance end of the first loading conveyor belt is operatively positioned to receive turkeys from the exit end of the lift conveyor.

According to yet a further aspect of the invention there is provided such a loading conveyor attachment which also has an upper conveyor belt connected to the support frame and operatively overlying the first loading conveyor belt, and means operatively connected with the upper conveyor belt for moving the upper conveyor belt at generally the same speed and in the same direction as said first loading conveyor belt.

These and other features of the invention will become more apparent to those skilled in the art in view of a more detailed description of preferred embodiments which illustrate the general principles of the invention.

BRIEF DESCRIPTION OF THE DRAWING

Referring to the Drawing wherein like numerals represent like parts throughout the several views:

FIG. 1 is a front elevational view, with portions thereof broken away, of a preferred configuration of a loading apparatus that practices my invention, illustrated in operatively raised position;

FIG. 2 is an enlarged fractional perspective view taken generally from the entrance end of the loading apparatus of FIG. 1 with a portion of the conveyor belting material removed;

FIG. 3 is an enlarged fractional perspective view of the lower support structure portion of the loading apparatus of FIG. 1 as viewed from the left or loading or delivery end of the apparatus;

DETAILED DESCRIPTION OF THE INVENTION

Figure 4:
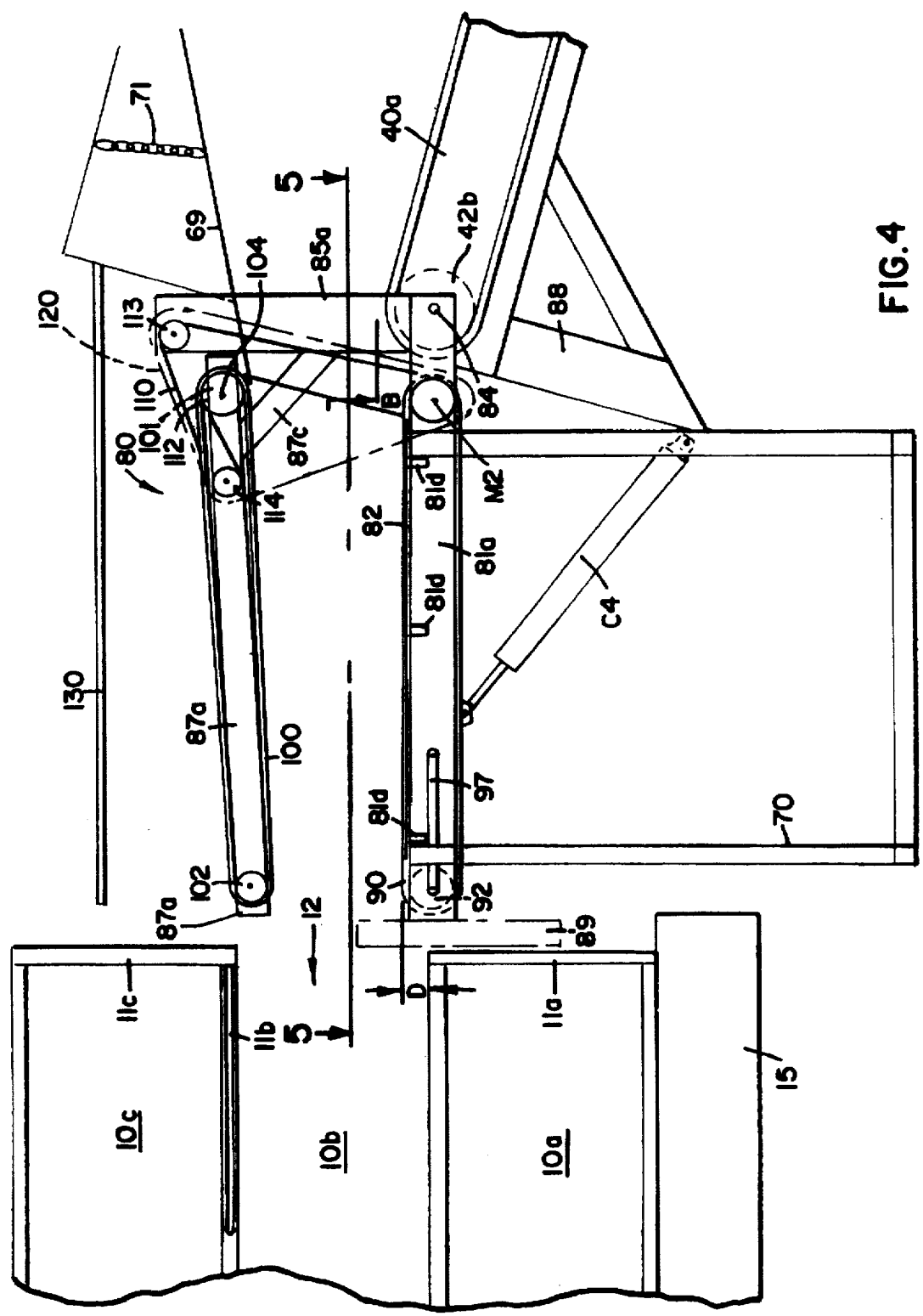
FIG. 4 is an enlarged front elevational view of the upper loading conveyor and support structure of the loading apparatus of FIG. 1 with portions thereof broken away, showing the upper loading or delivery end of the apparatus.

While this invention applies to the loading of any type of material or animal suitable for transport within a plurality of vertically stacked shipment containers, preferably in the nature of cages or coops, the invention will be described with respect to its preferred embodiment application of loading turkeys into vertically stacked transport coops. A column of such coops are generally illustrated in cross-section and in phantom at 10 in FIG. 1. The coops 10 are illustrated as they might typically be operatively positioned in elevated manner upon the bed 15 of a flatbed truck or the like. The coops 10 each have associated therewith a gate 11 which can be opened and closed to provide access through one side of the coop forming an access port 12 into the coop when the gate 11 is positioned in an "open" position. Transport coops 10 of the type used for transporting turkeys generally have gate members 11 that pivotally rotate into the top of the transport coop in overhead-door manner so as to provide relatively unimpeded access into the coop through the access port when the gate is lifted in an open position. In the FIG. 1 diagram, the gate member 11b of the second coop 10b of the stack of coops 10 is illustrated as having its gate positioned in an open position; whereas the remaining coops of the column are illustrated with their respective gates 11 positioned in a down or closed position. It will be understood by those skilled in the art that such representation is for illustration purposes only, and would not represent the typical gate position status of a column of stacked coops during a loading operation. During a loading operation, the gates of all unfilled coops of a column might be preopened in anticipation of loading.

Further details of the coop construction will not be belabored herein, such coop configurations being commonly known in the art. In general, the "width" of a gate, and the enclosed width dimension of the inner cavity of a coop is approximately 4 feet. A typical "depth" dimension of a coop is from 44 to 46 inches deep and the access port opening "height" which is closed by the coop gate is approximately 16 inches. Such dimensions can vary, and are generally dictated by the dimensions of the transport vehicle upon which the coops are stacked.

Referring to FIG. 1, a loader apparatus configured according to and practicing the principles of this invention is generally illustrated at 20. The loader generally includes a lower support frame 22 configured of spaced generally parallel and longitudinally extending channel-shaped primary stringers 22a and 22b interconnected by a plurality of cross-brace supports 22c. The channel portions of stringers 22a and 22b open toward the center of the lower support frame. The primary support frame stringers 22a and 22b extend between a first end, generally indicated at 28 which forms the entrance end of the apparatus (as hereinafter described in more detail), and a second end, generally designated at 29, which forms the coop loading or exit end of the apparatus. The cross-brace support 22c connecting the support frame stringers 22a and 22b at their first end 28 is mounted to the bottom surfaces of stringers 22a and 22b and engages the ground when the apparatus is operatively positioned for loading. The support frame 22 is mounted for transport to a pair of axles 24 and wheel assemblies generally indicated at 25. The axle and wheel assemblies provide for transport of the loader apparatus as well as for positioning of the apparatus relative to the transport vehicle carrying the coops to be loaded. An appropriate primary hitch assembly (not illustrated) is connected to the primary support frame 22 at the entrance end 28 thereof for operatively towing and positioning the loader apparatus from the entrance end 28. A secondary hitch apparatus (not illustrated) may also be secured to the second end 29 of the primary support frame 22 for facilitating positioning and movement of the loader apparatus 20 from the second end 29. The secondary hitch apparatus may be used to position and maneuver the entrance end 28 of the loading apparatus 20 through a door or gate of a turkey loading house, pen or the like, as is well-known in the art.

Referring to FIG. 3, the rear upper surfaces of the outer support frame stringers 22a and 22b are, in the preferred embodiment, formed in an inverted triangular configuration and define a pair of slidable support tracks 30 for a secondary support frame 32. The secondary support frame 32 includes a pair of spaced longitudinally extending slide supports 32a and 32b having triangular races formed respectively along their lower surfaces and configured to identically cooperatively overlie and mate with the triangular upper track portions 30 of the longitudinal stringers 22a and 22b, such that the support frame members 32a and 32b cooperatively longitudinally slide along the upper track surfaces 30 of the stringers 22a and 22b. The secondary support stringers 32a and 32b are transversely interconnected by means of a plurality of cross-brace struts 32c, which give the secondary support frame 32 rigidity to slide as an integral unit over the tracks 30. In the preferred embodiment the length of travel of the secondary support frame 32 in the longitudinal direction relative to the underlying lower support frame tracks 30 is approximately 12 inches. A first hydraulic cylinder C1 is operatively connected between the end cross-brace 22c at the exit end 29 of the apparatus and a cylindrical sleeve 32d rotatably encircling a forward cross-brace strut 32c of the secondary support frame 32, as best illustrated in FIG. 3. The hydraulic cylinder C1 operatively controllably longitudinally moves the secondary support frame 32 relative to the underlying lower support frame tracks 30, as hereinafter described in more detail. The secondary support frame 32 provides a slidable base for supporting the exit end of a primary lift conveyor assembly to be hereinafter described.

Figure 6:
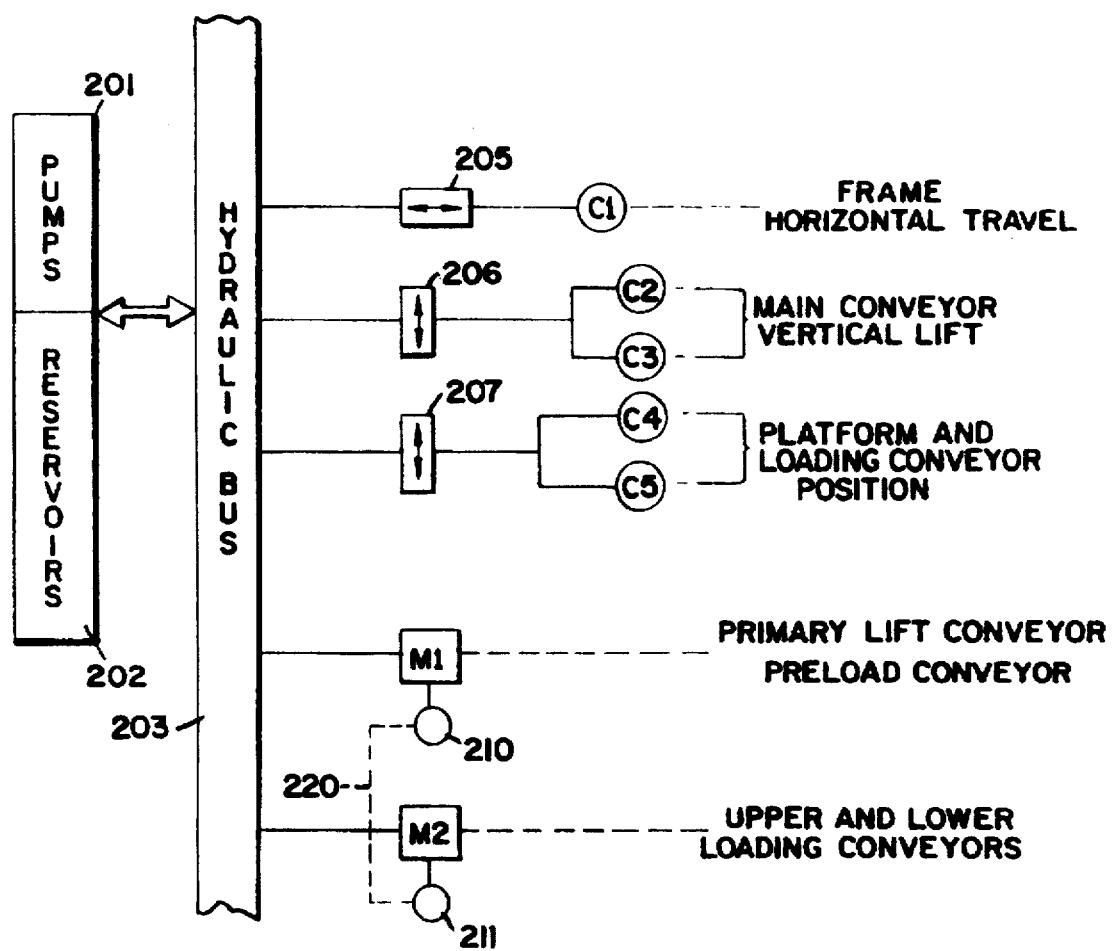
FIG. 6 is a functional schematic block diagram of the hydraulic network for the loading apparatus of FIG. 1.

A primary lift conveyor assembly includes a primary lift conveyor support structure, generally illustrated at 40 (FIG. 1). The conveyor support structure 40 generally includes oppositely disposed longitudinal support beams 40a and 40b interconnected by a plurality of transverse cross-braces 40c and intermediate longitudinally extending stringers 40d extending from the lower entrance end of the conveyor assembly to an upper, exit end of the conveyor assembly. Those ends of the support beams 40a and 40b disposed at the entrance end 28 of the loading apparatus are pivotally attached to the primary support stringers 22a and 22b for rotational movement relative thereto (hereinafter described in more detail). The longitudinally extending intermediate stringers 40d define a slidable bed for a slat or woven wire primary lift conveyor belt for lifting the turkeys to be loaded from the lower entrance end to the upper exit end of the lift conveyor assembly. The outer conveyor support stringers 40 define guide tracks for a pair of spaced endless roller chains 41. The edges of a sheet of woven wire or a plurality of slat portions are secured to the spaced roller chains 41 and define an endless conveyor belt 43, which extends between the side stringers 40a and 40b and slidably moves along and over the longitudinally extending stringers 40d, as illustrated in FIG. 2. The conveyor belt 43 is entrained over lower and upper end rollers, indicated at 42a (FIG. 2) and 42b (FIG. 4) respectively at the lower and upper ends of the conveyor assembly to provide a continuous moving conveyor surface between such ends for elevating turkeys thereon from the lower entrance end to the upper exit end of the primary conveyor assembly. While a metal (preferably galvanized) woven wire or slatted conveyor belt material has been described for implementing the primary conveyor belt 43, it will be understood that other materials such as plastic or rubberized belting materials could be used. Rollers 42a and 42b are mounted for rotation between the support stringers 40a and 40b by appropriate bearings (not illustrated). Each of the rollers 42a and 42b also has a pair of chain sprockets 45 connected for rotation with the rollers and aligned with and operatively engaging the roller chains 41, for driving the conveyor belt 43. One or more of the chain sprockets 45 are in turn connected for rotation with and are driven by a first hydraulic motor M1 through an appropriate gear reduction assembly generally illustrated at 46, in manner well-known in the art. The motor M1 is not mechanically illustrated in the figures, but is schematically illustrated in FIG. 6.

In the preferred embodiment, the first hydraulic motor M1 is also connected through the gear assembly 46 and an approximate drive chain or belt to an upper drive roller 44b of a preloader conveyor 52 sized to extend between and is slidably rotatably mounted to the primary support stringers 22a and 22b so as to form an operative extension of the primary lift conveyor 43 at its lower end. The details of such preload conveyor assemblies are well-known in the art, and other than for a brief description, will not be detailed herein. The preload conveyor 52 is a simple conveyor structure extending between the upper drive roller 44b and a lower idler roller 44a. In the preferred embodiment, the preload conveyor 52 has an endless belt 53 with a V-belt vulcanized inside entrained over the drive roller 44b and the idler roller 44a and provides the initial contact with birds handled by the loading assembly 20. The outer ends of the lower idler roller 44b terminate at wheels or rollers 54 which are entrained within a pair of channel tracks 55 that are placed in inverted manner on the ground such that the preloader conveyor can move in the longitudinal direction relative to the ground with little resistance. The drive roller 44b is secured in fixed longitudinal position relative to the lower end of the primary conveyor assembly such that birds leaving the preload conveyor belt 53 continuously move onto and are accepted by the primary lift conveyor belt 43. In the preferred embodiment, the preload conveyor belt 53 and the primary conveyor belt 43 are commonly driven by the first hydraulic motor M1 and its associated gear assembly 46 at the same speed such that birds traveling on the preloader conveyor make a gentle and safe transition to the primary conveyor belt 43.

In the preferred embodiment, the widths of the preload and primary conveyors is about 48 inches. The material for the preload conveyor belting is preferably a PVC material with wire reinforcing weave. The material used for the primary lift conveyor belting 43 can be of a number of different materials such as galvanized woven wire conveyor belting, plastic conveyor material or could be made of conveyor metal slat material such as one-inch steel channel material welded to the side roller chains 41.

The primary lift conveyor support stringers 40a and 40b have axle and roller assemblies generally indicated at 48 respectively projecting sidewardly outward from the stringer supports 40a and 40b and cooperatively engage and ride within the inner channel portions of the lower support frame longitudinal stringers 22a and 22b. The support roller assemblies 48 pivotally support the bottom weight of the primary conveyor assembly and allow the conveyor assembly to longitudinally move relative to the lower support frame 22 when the support frame 22 is resting on the ground. Since the preload conveyor assembly 52 is secured to the primary conveyor assembly and moves therewith, the preload conveyor assembly also longitudinally moves relative to the lower support frame 22 as directed by movement of the frame portions 22 of the primary elevator conveyor. As the preload conveyor moves in the longitudinal direction, it rides upon its roller members 54, which rest within the channel tracks 55 that are simply placed upon the ground surface to facilitate movement of the rollers 54 over the ground surface.

The primary lift conveyor assembly is enclosed by a canopy structure generally indicated at 60 which can be of solid material such as steel sheeting or could be of a wire mesh material with appropriate framing support.

The exit end 29 of the primary lift conveyor assembly is movably supported by means of a generally "A"-shaped linkage lift assembly 62 which is pivotally secured by the end of one of its legs to the longitudinal conveyor stringers 40a and 40b and by the end of its other leg to the spaced stringer members of the slidable secondary support frame 32. One each of the members 62a and 62b linkage lift assembly 62 is secured to each side of the primary conveyor assembly 40 and to each side of the secondary support frame 32. A pair of hydraulic cylinders C2 and C3 are connected between the secondary support frame stringers 32a and 32b respectively and the apex portion of the A-frame linkage lift assembly members 62a and 62b respectively, for cooperatively lifting the upper or exit end of the primary lift conveyor assembly 40 relative to the lower and secondary frames 22 and 32 respectively. As the linkage lift assembly 62 lift the exit end of the primary lift conveyor 40, the lower or first end of the conveyor assembly 40 pivotally moves about the axes defined by the axle supports for the roller assemblies 48, which longitudinally ride within the primary support beams 22. Operator controls for the hydraulic cylinder and hydraulic motor components of the system are mounted near the second or exit end 29 of the primary conveyor assembly, on the canopy structure portion thereof, as generally indicated at 65 in FIG. 1 for easy access by an operator positioned at said exit and as hereinafter described. A plurality of stabilizer and leveling jack supports 67 are connected to the lower support frame 22 at appropriate locations for stabilizing the entire loader apparatus 20 by lifting the frame 22 sufficiently relative to the ground so as to remove the primary weight of the system from the transport wheels 25. The conveyor support structure 40 and/or canopy structure 65 may be provided with appropriate clean-out openings and means for flushing or otherwise cleaning fecal matter, feathers and other debris from the conveyor and loading assemblies.

Figure 5:
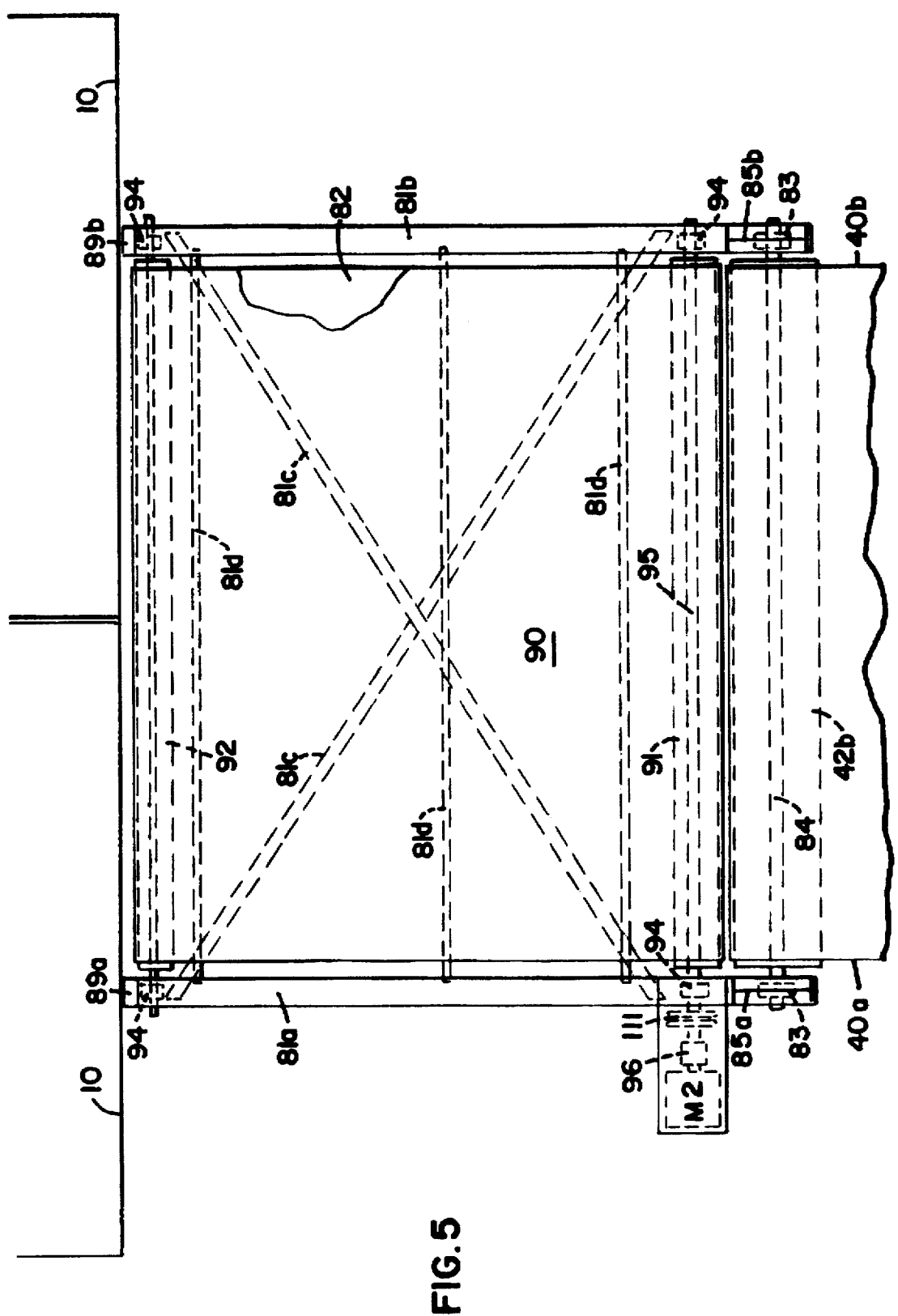
FIG. 5 is a plan view generally taken along the Line 5—5 of FIG. 4, with portions thereof broken away.

Referring to FIGS. 1, 4 and 5, a third conveyor assembly, generally hereafter referred to as the "loading" conveyor assembly and illustrated at 80 is operatively connected to the upper end of the primary lift conveyor supports 40, and performs the actual automated transfer of birds from the primary lift conveyor belt 43 and into the coops 10. The loading conveyor assembly generally has a framework assembly 80 pivotally connected to and supported by the lift conveyor supports 40. The framework assembly 80 includes a pair of lower side support beams 81a and 81b interconnected by diagonal cross-brace supports 81c. The spaced beams 81a and 81b are further connected near their upper surfaces by a plurality of laterally extending crossbraces 81d that form the support base for a conveyor support plate 82. The side beams 81a and 81b are pivotally mounted by means of bearings 83 to the shaft 84 of the upper roller 42b of the primary lift conveyor 43. The beams 81 may also be detachably connected to the shaft 84 or through other attachment means that can be configure by those skilled in the art, so that the entire loading conveyor assembly 80 can be detached from the primary lift conveyor assembly, for transport, storage, maintenance or the like.

A pair of upright beams 85a and 85b are respectively welded at generally right angles to the lower side beams. A pair of upper support beams 87a and 87b are welded to the upright beams 85a and 85b respectively near their upper distal ends and project forwardly in generally overlying relationship with the lower support beams 81a and 81b. The upper support beams 87a and 87b (not shown, but behind 87a in FIG. 4) are interconnected by suitable cross-brace supports (not illustrated), and are further supported by gusset supports 87c and 87d (not shown, but behind 87c in FIG. 4) respectively diagonally extending down to the upright support beams 85a and 85b. The upper and lower support beams 87 and 81 are generally parallel to one another, with the vertical separation spacing at their distal ends being slightly less (approximately 2 inches in the preferred embodiment) than the spacing along the upright support beams 85. In the preferred embodiment, the vertical spacing am the distal ends is approximately 10 inches, and the spacing along the beam is approximately 12 inches. In the preferred embodiment, the beams 81, 85 and 87 are of "T" beam configuration. The composite U-shaped support structure formed by the beams 81, 85, 87 and their interconnecting bracing pivotally rotates about the axle 84 under control of a pair of hydraulic cylinders C4 and C5. The cylinder portions of cylinders C4 and C5 are pivotally connected to a lower frame extension 88 of the lift conveyor primary supports 40, and the movable piston portions of the cylinders C4 and C5 are respectively pivotally connected to the lower beam supports 81a and 81b. The cylinders C4 and C5 are operatively connected to the hydraulic operator control panel 65 on the canopy structure 60. Cylinders C4 and C5 are simultaneously operable to pivotally control rotational movement of the loading conveyor support structure 80 about the axis defined by the shaft 84, thereby simultaneously raising or lowering the distal ends of the upper and lower support beams 87 and 81.

The loading conveyor assembly 80 generally includes upper and lower conveyor belts and interconnected drive assemblies, supported by the above-described support beam structures. A more detailed description of the loading conveyor assembly 80 is schematically illustrated with reference to FIGS. 4 and 5 and 6. Referring thereto, an endless lower loading conveyor belt 90 is entrained over a drive roller 91 positioned at one end to address the exit end of the primary lift conveyor 43. Its opposite end is carried by an idler roller 92 mounted at the forward or distal ends of the beams 81a and 81b. The drive and idler rollers 91 and 92 are mounted to the beams 81 by means of appropriate bearings 94. The support shaft 95 of drive roller 91 extends through the beam 81a and is operatively driven by a second hydraulic motor M2 through an appropriate coupling assembly 96. Proper tension is maintained on the conveyor belt 90 by means of an appropriate belt tightener assembly, generally indicated in FIG. 4 at 97. In the preferred embodiment the drive roller 91 has a 3-inch diameter, the idler roller has a 2.5-inch diameter and the support shaft 95 has a 0.75-inch diameter. The conveyor belt 90 rides over the support plate 82 to provide a uniform support surface for birds being loaded into the coops 10 thereby. The conveyor belt material 90 may be of any appropriate belting material, and is preferably of rubber belting material with a rough surface. The upper surface of the belt 90 is preferably positioned at a dimension "B" in FIG. 4 several inches lower than the top surface of the primary lift belt conveyor 43 such that birds coming off of the conveyor belt 43 fall easily onto the surface of the conveyor belt 90, with little or no gap therebetween. Similarly, the upper surface of the conveyor belting 90 at the distal forward idler roller end thereof is raised by several inches (dimension "D" in the figure) higher than the floor of the coop 10 into which the birds are being loaded. In the preferred embodiment the operative upper surface of belt 90 is approximately 38 inches long and of a width generally equal to the width of the lift conveyor belt 43. It will be understood that such dimensions are a matter of design choice and can be varied.

The upper conveyor illustrated in FIG. 4 is a simple conveyor having a conveyor belt 100 preferably of rubber material, entrained over a rear drive roller 101 and a forward idler roller 102. Rollers 101 and 102 are mounted by means of bearings (not shown) to the upper support beams 87a and 87b (not shown). The drive roller 101 is supported by a shaft 104 that projects through the beam 87a. The idler roller is spaced back from the distal end of beams 87 such that the forward edge of conveyor 100 will lie several inches in from the forward edges of the beams 87. The upper conveyor belt 100 is driven at the same speed as the lower conveyor belt 90 by means of the hydraulic motor M2 (see FIG. 5). The hydraulic motor M2 is either directly connected to rotate the lower drive roller 91 of the lower conveyor 90 (as shown) or may be connected to drive the roller 91 by means of an appropriate V-drive belt. The upper drive roller 101 is driven from the motor M2 by means of a V-belt 110 that is entrained over a lower drive pulley 111 mounted to shaft 95 (FIG. 5), an upper driven pulley 112 mounted to shaft 104, an idler pulley 113, and a belt take-up pulley 114. As configured the facing surfaces of the conveyor belts 90 and 100 both travel in the same direction and at the same speed. Alternatively, the relative sizes of pulleys 111 and 112 can be designed such that the upper conveyor 100 will travel at a linear speed slightly greater than that of the lower conveyor 90. A protective plate 120 is positioned to cover the pulley and belt configuration and to prevent harm thereby to the system operator. Further, a protective roof or cover plate 130 is preferably provided over the upper loading conveyor assembly to protect the upper conveyor 100 from environmental elements.

A dual operator platform 70 is connected to an extends downwardly from the lower support beams 81a and 81b so as to laterally extend below the upper exit of the conveyor support assembly and in cantilevered manner to either side of the primary lift assembly structure. The operator platform 70 is configured such that two human operators can stand on the platform, one on either side of the loading conveyor assembly 80 for monitoring the coop loading operation and/or for assisting in and directing the unloading of birds from the loading conveyor and into the coops 10. The loading platform pivotally moves with the loading conveyor assembly under control of the hydraulic cylinders C4 and C5.

The upper conveyor 100 ensures that the head, neck and upper body of a bird carried by the lower conveyor 82 will initially travel at the same speed as the lower conveyor so that the bird does not injure its head or neck area and does not tip over backwards as it is deposited from the primary lift conveyor 43 to the lower loading conveyor 90 and as the bird is carried by conveyor 90. As is typical for known primary lift conveyors, a deflector ceiling member 69 is provided at the exit end of the primary conveyor assembly and is vertically adjustable by means of a chain mechanism 71 or the like to cause the birds carried by the conveyor 43 into a sitting position as they approach the loading conveyor assembly 80. For the purposes of this specification, the term "sitting position" is intended to mean either an actual sitting, squatting or crouching attitude assumed by the bird. Therefore, the birds will already be in a sitting position when they leave the primary conveyor 43 and are deposited onto the loading conveyor 90. The lineal speed for the primary loading belt conveyor 43 is typically from about 4 to 5 feet per minute. In order to accomplish the purposes of this invention it is anticipated that the lineal speed of the lower and upper loading conveyor belts 90 and 100 respectively will be at least 25% faster than that of the primary conveyor belt 43, and preferably from 3 to 5 times faster, such that birds deposited on the loading conveyor 90 will be accelerated and quickly deposited through the access port 12 of the coop 10 into which they are being loaded, while still in their sitting position, such that they will scoot into the coops without any need for human operator intervention other than to direct the birds to the desired coop to be loaded. Further, due to the slight drop in height (distance "B" in FIG. 4) between the conveyor 43 and 90 surfaces and the relative speed differences between the conveyors, the birds will not get caught between or damaged by the conveyors as they proceed from conveyor 43 to conveyor 90.

As previously described, all hydraulic components of the system are operated by means of levers on the control panel of the canopy structure 65 located within easy reach of an operator standing on the platform 70. All of the hydraulic components of the system are operatively connected to a common hydraulic system which is readily operable, in a manner generally known in the art, by means of the power take-off assembly of a tractor or by auxiliary hydraulic power pack assemblies (not illustrated but well-known in the art). A schematic block diagram of the hydraulic network for operating the various hydraulic cylinders and motors of the system respectively is illustrated in FIG. 6. It will be understood that the diagrams of FIG. 6 are functional in nature, and that those skilled in the art can readily implement true hydraulic schematic diagrams from the functional blocks illustrated. Referring to FIG. 6, one or more hydraulic pumps and reservoirs, as needed, are provided and are schematically illustrated at 201 and 202 respectively. The number and type of such pumps and reservoirs required will depend upon the particular selection and arrangement of hydraulic cylinders and other components used throughout the system. In FIG. 6, the pumps and reservoirs are illustrated as communicating with a hydraulic bus line, generally indicated at 203. The individual hydraulic control members and hydraulic cylinders are operatively supplied from the hydraulic bus 203. Longitudinal or horizontal movement of the secondary support frame 32 relative primary support frame 22 of the apparatus is provided by means of the hydraulic cylinder C1, operated by a control module 205 which is connected to the hydraulic bus 203. Raising and lowering of the exit end of the primary lift conveyor assembly by means of the linkage lift assembly 62, is controlled by means of the hydraulic cylinders C2 and C3 which are commonly activated by means of the control module 206, which is operatively connected to the hydraulic bus 203. Pivotal tilting motion of the loading conveyor assembly 80 and its associated operator platforms 70 is performed by the hydraulic cylinders C4 and C5 which are commonly controlled by the control module 207, which is operatively connected to the hydraulic bus 203.

The hydraulic motor M1 which controls movement and speed of the primary lift conveyor 43 and its operatively connected preloading conveyor 52 is shown as being operatively connected to the hydraulic bus 203 and controlled by means of a hydraulic switch control 210. Similarly, the hydraulic motor M2 which operatively controls the movement and speed of the loading conveyors 90 and 100 is illustrated as being operatively connected to the hydraulic bus and controlled by means of a hydraulic switch 211. The actuator members for operatively actuating the hydraulic control modules 205, 206, 207, 210 and 211 are physically located on the operator control panel 65 of the loading apparatus. Operator control switches 210 and 211 are hydraulically interconnected as indicated by the dashed line 220 in FIG. 6 such that operator control switch 210 cannot be activated to energize the primary lift conveyor 43 if the loading conveyors 90 and 100 have been stopped by means of the hydraulic control switch 211. Those skilled in the art can readily select components and/or design appropriate hydraulic networks to implement this function. Alternatively, sensor means could be provided for actually sensing the speed of the loading conveyor belts 90 and 100 such that the primary lift conveyor 43 would be deactivated, or energized at a speed calculated to always be less than that of the loading conveyors 90 and 100. The reverse situation is not true, however, since it may be desirable to continue to run the loading conveyors 90 and 100 even after the primary lift conveyor belt 43 has stopped.

In operation, the loading apparatus 20 is simply positioned and maneuvered by either its first or second ends 28 or 29 such that the entrance end 28 of the apparatus is positioned through and into the entrance of a turkey house or a collection pen for the turkeys to be loaded. The loading apparatus 20 is then disengaged from the towing and maneuvering tractor or implement and is positioned generally as illustrated in FIG. 1 with the automatic levelers 67 being activated to level and securely stabilize the loading apparatus on the ground. A transport vehicle containing the coops to be loaded is then driven into relatively close proximity to the exit end of the loading conveyor assembly 80 such that the gate members 11 of the coops 10 are generally aligned perpendicular to the direction of travel of the conveyors. Typically, the coops are positioned relative to the centerline of the loading conveyors 90 and 100 such that two coops can simultaneously be loaded from the conveyor 90 at one time (as is generally indicated in FIG. 5). Half of the turkeys carried by the conveyor 90 will be deposited in the left coop, and the other half will be deposited in the right coop. The operator(s) standing on the operator platforms 70 can help to direct and guide the appropriate number of turkeys into each of the cages being loaded.

When the transport vehicle has been properly positioned such that the coops to be loaded are in proper alignment with the loading conveyor assembly 80, an operator on the loading platform 70 can activate the control modules 205, 206 and 207 to appropriately position the exit end of the loading conveyor assembly 80 into a proper vertical and horizontal loading position relative to the coops to be loaded, as indicated in FIG. 4. When in such proper loading position, the bumper pads 89 of the support frame members 81 will engage the forward edges of the coops 10, and the distal or exit ends of the conveyors 90 and 100 will be positioned relative to the entrance port 12 of the coop to be loaded such that the upper surface of the loading conveyor 90 will be several inches above the floor of the coop and the lower surface of the upper conveyor 100 will be positioned somewhat lower than the roof and retracted gate portion of the coop.

The pair of coops being addressed by the loading conveyors 90 and 100 are then loaded by energizing the hydraulic motors M1 and M2 by means of the control switches 210 and 211 to lift turkeys herded toward the entrance end 28 of the assembly up the preloading conveyor 52 and the primary lift conveyor 43 to the loading conveyors 90 and 100. As the turkeys elevated by the primary lift conveyor 43 approach the exit end thereof, their heads will engage the deflector panel 69, forcing the turkey to a sitting position. As the turkey leaves the primary lift conveyor belt 43 and drops onto the loading conveyor belt 90, it will be maintained in its sitting position as a result of the upper loading conveyor belt 100 moving at the same speed as the lower loading conveyor 90. Due to the increased speed of the conveyors 90 and 100 relative to the primary lift conveyor 43, the turkey will be propelled at an accelerated speed toward and into the entrance port 12 of the coop 10 such that as the turkey leaves the exit end of the conveyor 90 it will simply scoot into the open coop with little or no assistance being required by the operator(s) standing on the operator platforms 70.

When the pair of coops that are being filled are full, the operator simply stops the conveyors by means of the control switches 210 and 211, closes the gates of the filled coops 11 and activates the control modules 205, 206 and 207 to reposition the exit end of the loading conveyor assembly 80 in position with the next higher or lower pair of coops to be filled. It will be appreciated that such loading operation can be vertically performed either from the bottom up or from the top down with respect to the column of stacked coops to be loaded. After a complete vertical column of coops is filled, the loader apparatus 20 is simply moved back away from the coops by means of the horizontal travel cylinder C1, and the transport vehicle is moved forward so as to generally align the loading conveyor assembly 80 with the next pair of coop column to be loaded, and the process is repeated until all coops of the transport vehicle have been filled. It will be appreciated that the human operator time required to perform the loading operation is minimized by use of the above-described loading apparatus, and that physical damage and traumatization to the birds being loaded is minimized.

While the invention has been described with respect to a preferred embodiment thereof, and with respect to various configurations of components and materials used to implement them, it will be understood by those skilled in the art, that the invention is not to be limited in any manner by the specifics of either the embodiment illustrated or the components or materials described herein. Such embodiment and components have been described to illustrate clear examples of how the principles of the invention can be specifically applied. All alternatives and modifications of the foregoing are intended to be covered within the scope of the appended claims.

What is claimed is:

1. A method of loading birds into a transport coop of the type having an access loading port opening through a side of the coop, comprising the steps of:
   a. positioning an exit end of a bird loading conveyor belt apparatus into loading proximity with the access port of the transport coop;
   b. moving birds by means of said loading conveyor belt apparatus from an entrance end to the exit end thereof; and
   c. accelerating the birds being moved at said exit end to automatically continuously deposit said birds directly from the conveyor belt apparatus into the coop through its access port.

2. The method as recited in claim 1, further including the steps of causing the birds being moved by said loading conveyor belt apparatus to assume a sitting position prior to acceleration thereof, and maintaining said birds in their sitting positions throughout the acceleration and deposition step.

3. The method as recited in claim 2, wherein the step of maintaining said birds in a sitting position includes vertically sandwiching the birds during the acceleration step between a pair of oppositely disposed conveyor belts moving generally at the same speed and in the same direction.

4. The method as recited in claim 1, wherein the step of positioning the exit end of the loading conveyor belt apparatus includes the step of vertically positioning the exit end that accelerates the birds into loading proximity with the access port of said coop.

5. A method of loading birds from a conveyor belt apparatus into a column of stacked transport coops of the type having access port openings generally vertically aligned through a sidewall of the coops, comprising the steps of:
   a. moving the birds to be loaded by a first conveyor belt moving at a first speed, from an entrance position remote from said coops to an exit position adjacent to at least one of said coops to be loaded;
   b. accelerating said birds by a second conveyor belt operatively aligned with the exit end of said first conveyor belt to a second speed greater than said first speed; and
   c. directing and depositing said accelerated birds directly from said second conveyor belt through the access port of said one coop being loaded, thereby loading the birds into said coop.

6. The method as recited in claim 5, including the step of providing a moving ceiling overlying said second conveyor belt for maintaining said birds in a desired vertical orientation while on said second conveyor belt.

7. The method as recited in claim 6, including the step of causing said birds to crouch to a sitting position near the exit end of said first conveyor belt.

8. The method as recited in claim 5, including the step of causing said birds to crouch to a sitting position near the exit end of said first conveyor belt.

9. The method of claim 5, including the step of practicing said method to first fill said one coop with said birds to a desired coop capacity; and then adjusting the vertical heights of the exit end of the first conveyor belt and the second conveyor belt to operatively align with the access port of a second one of said stacked transport coops, for loading said second transport coop.

10. The method of claim 5, including the steps of successively filling a transport coop according to the recited method and then vertically and horizontally adjusting the positions of the exit end of the first conveyor belt and the second conveyor belt, to load the next vertically adjacent coop of the stacked transport coop column; and successively repeating the loading and adjusting steps until all of the stacked transport coops of the column that are to filled have been filled.

11. The method of claim 5, wherein the step of accelerating said birds by said second conveyor belt comprises accelerating the lineal speed of said birds with said second conveyor belt by at least 25% from the speed at which they were traveling at while on said first conveyor belt.

12. The method of claim 11, wherein the step of accelerating said birds by said second conveyor belt comprises accelerating the lineal speed of said birds with said second conveyor belt by from up to 3 to 5 times faster than the speed at which they were traveling at while on said first conveyor belt.

13. A loading apparatus for loading birds into a transport coop through an access port formed in a side of the coop, comprising:

a. a lift conveyor of a type suitable for carrying birds to be loaded into the coop, having a first conveyor belt extending between first and exit ends, said first end being disposed adjacent the ground;

b. means for moving said first conveyor belt at a first speed;

c. a loading conveyor generally longitudinally aligned with and forming an operative extension of said lift conveyor at said exit end thereof, said loading conveyor having a loading conveyor belt of a type suitable for carrying said birds, and extending between said exit end of said first conveyor belt and a loading end;

d. lift means operatively connected with said lift conveyor and said loading conveyor for controllably elevating said loading end of said loading conveyor belt for longitudinal alignment with the access port of the transport coop; and e. means for operatively moving said loading conveyor belt at a second speed, relatively faster than said first speed; whereby birds conveyed by said lift conveyor are deposited from said exit end onto said loading conveyor and are accelerated and directly deposited from the loading end of said loading conveyor belt into the transport coop through said access port.

14. The loading apparatus of claim 13, wherein said loading conveyor includes an upper conveyor belt vertically spaced from and overlying said loading conveyor belt so as to operatively receive said birds therebetween, and generally moving at said second speed; wherein body portions of said birds engaging both said loading and said upper conveyor belts will be subjected to generally the same forces in the direction of travel of said loading and said upper conveyor belts.

15. The loading apparatus of claim 14, including means for adjusting the relative movement speeds of said loading conveyor belt and said upper conveyor belt.

16. The loading apparatus of claim 14, wherein the access port of said coop to be loaded has a vertical opening dimension suitable for accepting birds therethrough and wherein the operative vertical spacing between said loading conveyor belt and said upper conveyor belt at said loading end is less than said vertical opening dimension of said coop.

17. The loading apparatus as recited in claim 13, wherein said second speed is greater or equal to 25% faster than said first speed.

18. The loading apparatus as recited in claim 13, wherein said second speed is greater or equal to twice that of said first speed.

19. The loading apparatus as recited in claim 13, wherein said second speed is from about 3 to 5 times faster than said first speed.

20. The loading apparatus as recited in claim 13, further including a preload conveyor having a preload conveyor belt operatively extending between the ground surface and said first end of said lift conveyor, and means operatively connecting said preload conveyor with said lift conveyor for moving said preload conveyor belt generally at said first speed.

21. The loading apparatus of claim 13, wherein said lift means includes hydraulically actuated means.

22. The loading apparatus of claim 13, wherein said lift conveyor includes longitudinal positioning means for moving said lift conveyor belt in the longitudinal direction of said lift conveyor.

23. The loading apparatus of claim 13, wherein said lift means cooperatively moves said loading conveyor with the exit end of said lift conveyor belt.

24. The loading apparatus of claim 13, wherein the general plane of said loading conveyor belt is vertically spaced slightly lower than the height of said lift conveyor belt at said exit end thereof.

25. The loading apparatus of claim 13, wherein said loading conveyor includes at least one operator platform stand operatively connected therewith suitable for holding a human operator.

26. The loading apparatus of claim 13 including control means operatively connected with said means for moving said lift conveyor belt and with said means for moving said loading conveyor belt, for coordinating the relative movements of said lift conveyor belt and said loading conveyor belt such that movement of said lift conveyor belt stops if said loading conveyor belt stops.

27. The loading apparatus of claim 13, including means operatively connected adjacent said exit end of said lift conveyor for engaging the head portions of birds being transported by said lift conveyor for urging said birds into a crouched or sitting position.

28. The loading apparatus of claim 13, including means for detachably connecting said loading conveyor to said lift conveyor.

29. The loading apparatus of claim 13, including adjustment means for controllably adjusting the position of said loading end of said loading conveyor belt relative to the exit end of said lift conveyor belt.

30. The loading apparatus of claim 29, wherein said adjustment means pivotally moves said loading end relative to said exit end.

31. A loading conveyor attachment for directly loading turkeys into a transport coop and configured for operative connection to a turkey loading lift conveyor of the type configured to move turkeys from an entrance end to an exit end of the lift conveyor, said attachment comprising:

a. a support frame;

b. a first loading conveyor belt mounted to said support frame and operatively extending between an entrance end and a loading end;

c. means operatively connected with said first loading conveyor belt for moving said first loading conveyor belt at a speed greater than that of the lift assembly conveyor; and d. means for detachably mounting the support frame adjacent an exit end of the lift conveyor such that said entrance end of said first loading conveyor belt is operatively positioned to directly receive turkeys from the exit end of said lift conveyor.

32. The loading conveyor attachment as recited in claim 31, further comprising an upper conveyor belt connected to said support frame and operatively overlying said first loading conveyor belt, and means operatively connected with said upper conveyor belt for moving cooperatively addressed portions of said upper and said first loading conveyor belts at generally the same speed and in the same direction.

33. The loading conveyor attachment as recited in claim 31, further including means for adjustably varying the position of said loading end of said first loading conveyor belt relative to the exit end of said lift conveyor.

* * * * *